A. L. DEWEY.
Feed Motion for Sewing Machines.

No. 56,730.

Patented July 31, 1866.

WITNESSES
Richard E Morgan
Mrs Helen L Dewey

INVENTOR
Albert L Dewey

UNITED STATES PATENT OFFICE.

ALBERT L. DEWEY, OF WESTFIELD, MASSACHUSETTS

IMPROVEMENT IN FEED-MOTIONS FOR SEWING-MACHINES.

Specification forming part of Letters Patent No. 56,730, dated July 31, 1866.

*To all whom it may concern:*

Be it known that I, ALBERT L. DEWEY, of Westfield, in the county of Hampden, in the State of Massachusetts, have invented a new and Improved Feed-Motion; and I do hereby declare that the following is a full, clear, and exact description thereof, which will enable those skilled in the art to make and use the same, reference being had to the accompanying drawings, forming part of this specification, and in which—

Figure 1:
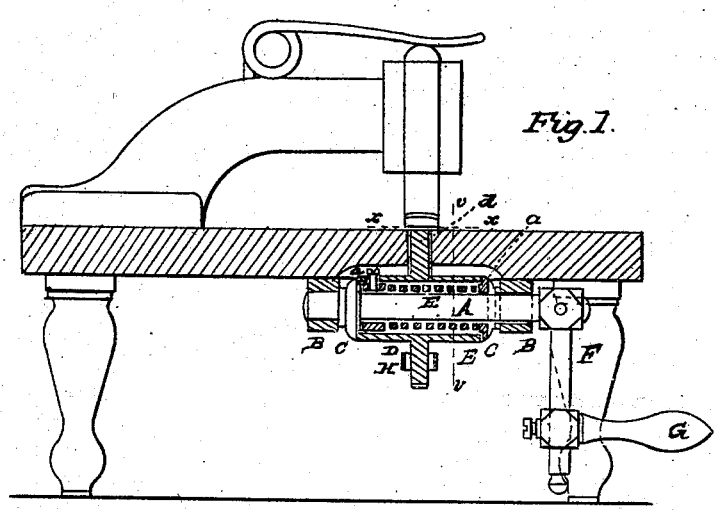
Figure 2:
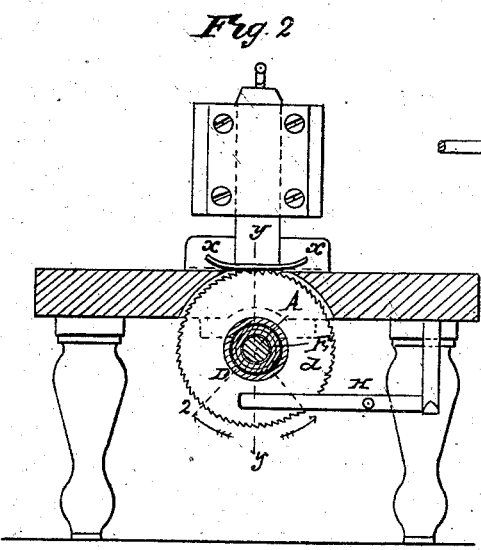
Figure 3:
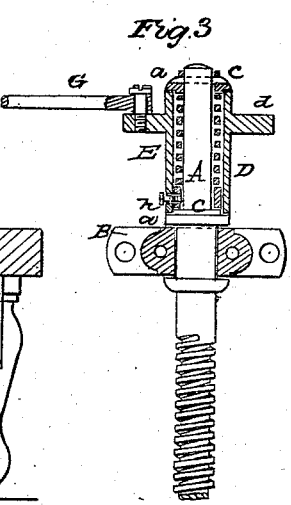
Figure 4:

Figure 1 is a vertical section of my invention taken in the line y y, Fig. 2. Fig. 2 is a transverse section of the same taken in the line v v, Fig. 1; Fig. 3, the same view as Fig. 1, showing a modification of the invention; Fig. 4, a detached view of a spring pertaining to the same.

Similar letters of reference indicate corresponding parts.

This invention relates to a new and improved means for imparting an intermittent rotary motion to the feed-wheel used in sewing-machines and in other machines in which a feed is required.

A represents a shaft supported in bearings B B, having two bosses, c c, upon it, rabbeted or grooved at their peripheries to receive a hollow or tubular hub, D, which is fitted loosely on the hubs or bosses c c, the flanges a, formed by the rabbets or grooves in the latter, preventing the hub from moving laterally thereon, as will be understood by referring to Fig. 1.

E is a spiral spring. This spring is bored truly cylindrical or slightly conical, and is accurately fitted throughout its length to the shaft A, between the two bosses c c and consequently within the hub D. One end of this spring is connected to the hub D by a screw, as shown at h, the opposite end of the spring being free or disconnected.

The hub D and feed-wheel d are formed in one piece, the latter having its periphery serrated or toothed in the usual manner, and upon the surface of this wheel the article to be moved is placed, as shown at x x, Figs. 1 and 2.

F is a rocker-arm firmly attached to the shaft A, for the purpose of actuating the same.

G is an adjustable handle, which may be fastened upon the rocker-arm F at any required distance from the shaft A, for the purpose of graduating the feed.

H is a friction-spring for preventing the wheel d from turning during the return-movement of the rocker-arm F.

The operation is as follows: The action of the spring E is peculiar. When the shaft A is turned by the rocker-arm F in the direction of the arrow 1, the spring E, by reason of the friction produced by its closeness of contact with and many points of bearing upon the shaft, will be contracted and bear upon the shaft A, so as cause the hub D, connected therewith, to rotate also, the spring forming the only connection between the shaft A and the hub D. The instant the return-movement of the rocker-arm F commences, the spring E, by reason of the friction produced by the shaft A, relaxes or unwinds slightly, but sufficiently to allow the shaft to move back loosely within the hub D and spring E, while the wheel d is held stationary by the friction-spring H.

In case the spring E should be fitted to a slightly conical or tapering shaft, the free or disconnected end of the spring should conform to the small part of the conical or tapering shaft. The condition required for the successful working of the spring E is that the shaft A should accurately fill the bore of the spring throughout its length, from h to a.

In certain cases, where it is desired to impart a feeding action to the shaft A, the driving motion may be given to the hub D and wheel d, as clearly shown in Fig. 3.

I claim as new and desire to secure by Letters Patent—

The spring E and hub D, applied to shaft A substantially as shown, and all arranged to operate in the manner and for the purpose set forth.

ALBERT L. DEWEY.

Witnesses:
RICHARD E. MORGAN,
Mrs. HELEN L. DEWEY.